(12) United States Patent
Doglioni Majer

(10) Patent No.: US 8,047,126 B2
(45) Date of Patent: *Nov. 1, 2011

(54) DISPENSING ASSEMBLY FOR PREPARING BEVERAGES FROM SOLUBLE PRODUCTS

(75) Inventor: Luca Doglioni Majer, Carate Urio (IT)

(73) Assignee: Tuttoespresso S.p.A., Caronno Pertusella (IT)

( * ) Notice: Subject to any disclaimer, the term of this patent is extended or adjusted under 35 U.S.C. 154(b) by 745 days.

This patent is subject to a terminal disclaimer.

(21) Appl. No.: 10/530,023

(22) PCT Filed: Oct. 3, 2002

(86) PCT No.: PCT/IT02/00632
§ 371 (c)(1),
(2), (4) Date: Nov. 16, 2005

(87) PCT Pub. No.: WO2004/030500
PCT Pub. Date: Apr. 15, 2004

(65) Prior Publication Data
US 2006/0130664 A1    Jun. 22, 2006

(51) Int. Cl.
*A47J 31/06* (2006.01)
(52) U.S. Cl. ............ 99/295; 99/299; 99/302 R; 426/433
(58) Field of Classification Search ............ 99/295, 99/302 R, 299; 426/433, 112, 115, 77, 82
See application file for complete search history.

(56) References Cited

U.S. PATENT DOCUMENTS

| 5,008,013 | A | | 4/1991 | Favre et al. |
| 5,067,395 | A | * | 11/1991 | Timm ........................... 99/282 |
| 5,242,702 | A | * | 9/1993 | Fond ........................... 426/433 |
| 5,255,593 | A | * | 10/1993 | Bunn et al. ................. 99/280 |
| 5,287,796 | A | * | 2/1994 | Timm ........................... 99/282 |
| 5,347,916 | A | | 9/1994 | Fond et al. |
| 5,398,596 | A | | 3/1995 | Fond |
| 5,472,719 | A | | 12/1995 | Favre |
| 5,656,316 | A | | 8/1997 | Fond |
| 5,948,455 | A | | 9/1999 | Schaeffer et al. |
| 6,832,542 | B2 | * | 12/2004 | Hu et al. .................... 99/302 R |
| 7,100,496 | B2 | * | 9/2006 | Majer Doglioni ........... 99/295 |
| 7,243,597 | B2 | * | 7/2007 | Hu et al. ...................... 99/283 |

FOREIGN PATENT DOCUMENTS

| CH | 688 686 A | 1/1998 |
| CH | 688686 | 1/1998 |
| DE | 74 30 910 U | 4/1976 |
| WO | WO 02076270 | 10/2002 |

* cited by examiner

Primary Examiner — Reginald L Alexander
(74) *Attorney, Agent, or Firm* — Nixon & Vanderhye P.C.

(57) ABSTRACT

A method and a group are described for the preparation of a beverage from soluble products contained in a disposable cartridge, based on the regulation of the dispensing of the beverage in such way that the soluble product is delivered in suspension for at least 75% of the total dispensing time.

40 Claims, 3 Drawing Sheets

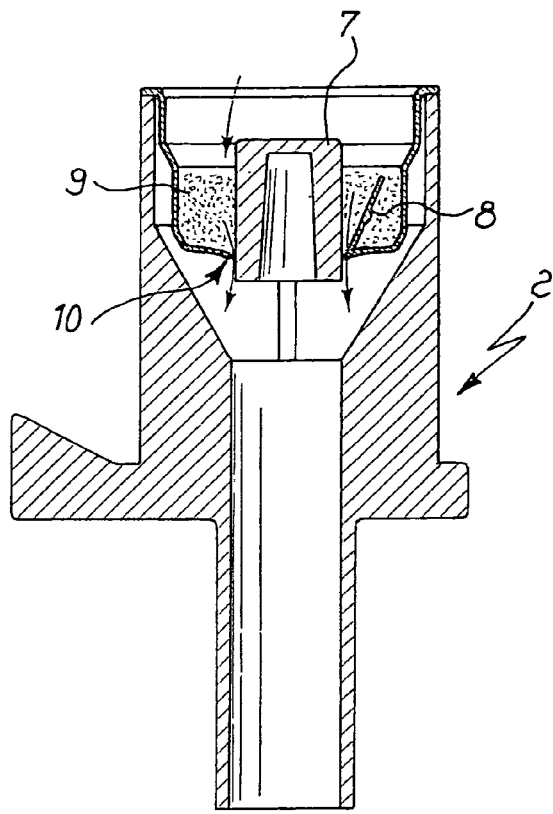
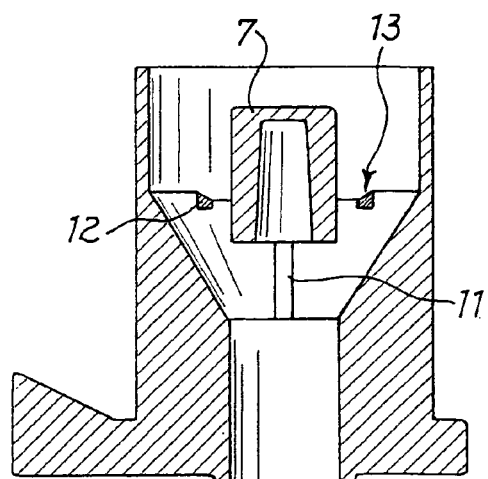
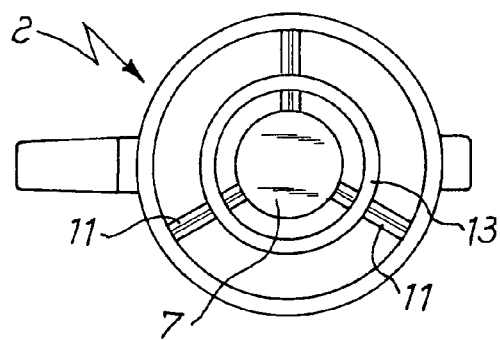

DISPENSING ASSEMBLY FOR PREPARING BEVERAGES FROM SOLUBLE PRODUCTS

CROSS REFERENCE TO PRIORITY APPLICATION

This application claims the benefit of International Application PCT/IT2002/000632, filed Oct. 3, 2002, incorporated herein by reference in its entirety.

TECHNICAL FIELD OF THE INVENTION

The present invention relates to the preparation of beverages from soluble products contained in disposable cartridges, for example the preparation of beverages carried out in machines provided with a collecting device made to receive a cartridge of soluble product in order to produce hot beverages such as coffee, cappuccino, tea or the like.

BACKGROUND ART

In the known machines, groups designed for the preparation and dispensing of beverages generally comprise a collecting device having a seat that receives a disposable cartridge.

Since the disposable cartridges are originally sealed to avoid spillage of the soluble product during handling, the collecting device is generally fitted with a piercing member that opens one or more outlet openings on one wall of the cartridge (for example, on the base wall of the same) in correspondence to a plurality of pre-established breaking lines.

Once the cartridge is inserted into the appropriate seat on the collecting device, water is admitted under pressure to the inside of the cartridge through an entry port of the same in order to form a beverage consisting of a suspension or dispersion in water of the soluble product, which is dispensed through an outlet opening or hole located on the cartridge. A dispensing group must guarantee complete and uniform solubilization or suspension/dispersion of the product in the fluid (usually water) inside the cartridge and good final appearance of the beverage; in the case of coffee and cappuccino good final appearance means being "creamy", i.e. having an appreciable amount of a layer of enduring small-bubble froth. Obtaining such a result is complicated by the fact that the shape and dimensions of the cartridge are the same for all products dispensed, while the amount of soluble product in the cartridge varies dramatically from product to product (for example: 1.5 grams for espresso coffee and 15-16 grams of product for chocolate and cappuccino). This variation in amount affects the capacity to solubilize the product homogeneously. Another problem of the known dispensing groups is guaranteeing thorough cleaning of the group; this requires avoiding the use of dispensing conduits and tubes with section less than 2 mm, because of the risk of formation of coatings and residues in the same.

In a previous patent application, still pending, in the name of the same Applicant, it is suggested to provide a throttling arrangement along the dispensing course of the beverage with the aim of improving the mixing of the soluble product with the water admitted to the cartridge and to creating a pressure gradient inside the cartridge so as to obtain a good quality beverage with attractive appearance on delivery. This has been achieved by means of a piercing member having a diameter greater than the diameter of the product outlet opening: the pressure of the water on arrival in the cartridge determines solubilization and delivery of the beverage.

However, it has been found that the beverage obtained is not always optimum, in particular with respect to the amount and duration of cream produced.

SUMMARY OF THE INVENTION

The object of the present invention is therefore to produce a dispensing group for the preparation of beverages able to guarantee optimum delivery from point of view of the beverage quality, independently of the characteristics of the cartridge containing the soluble product.

This object is achieved by the present invention by means of a group for the preparation of beverages. Particular embodiments of the dispensing group according to the invention are set out in the dependent claims.

According to a first aspect of the present invention, the beverage preparation group comprises means of regulating the dispensing of the beverage in such way that the soluble product is delivered in suspension for at least 75% of the total dispensing time.

According to another aspect of the present invention, the means of regulation comprise an outlet opening in a cartridge and a piercing member of such dimensions that the piercing member initially engages said outlet opening completely, i.e. before the dispensing of the beverage, and that one or more outlet ports are present between said cartridge and said piercing member during and/or after the dispensing of the beverage.

In a preferred embodiment, the dispensing port has a substantially circular crown section, and the ratio R between the diameter D2 of the section of engagement of the piercing member and the diameter D1 of the outlet opening is $1 \leq R \leq 1.067$, preferably $1 \leq R \leq 1.04$ and still more preferably $1 \leq R \leq 1.02$. For example, if the diameter of the piercing member is 15 mm, the diameter D1 of the outlet opening in the cartridge is $15 \leq D1 \leq 16$ mm, more preferably $15 \leq D1 \leq 15.6$ mm, still more preferably $15 \leq D1 \leq 15.3$ mm.

In another possible embodiment, usable as alternative to or in combination with the previous one, the dispensing group of the invention comprises an outlet opening in a cartridge and a piercing member of such dimensions that the piercing member initially engages said outlet completely, i.e. before the dispensing of the beverage, and one or more ports are present between said cartridge and said piercing member during and/ or after the dispensing of the beverage, as well as means of limiting the deformation of the base wall of the cartridge to a maximum angle of approximately 45 degrees. In an embodiment such means of limiting the deformation comprise one or more stop elements located on said collecting device in proximity of the outlet opening of the mounted cartridge.

Such stop elements could comprise for example: one or more supports of the piercing member, or a annular member having diameter greater than the outlet opening.

In the latter case, the annular member has a tilted surface portion turned towards the piercing member and towards the base wall of the cartridge, with inclination between 0° and 45° with respect to a horizontal plane supported on the annular member, more preferably with inclination between 15° and 38° or still more preferably equal to 30° with respect to a horizontal plane supported on the annular member.

In accordance with a second aspect of the present invention, a method for preparation of beverages is provided for. Further advantageous characteristics of the method according to the invention are set out in the dependent claims.

The dispensing group according to the invention has numerous advantages. The reduced diameter dispensing ports that are formed between cartridge and piercing member during the beverage dispensing phase constitute a temporary throttling, i.e. a throttling that is eliminated at each delivery when the cartridge is removed, and that is newly created at the following delivery when a new cartridge is inserted into the collecting-piercing device. Further advantages are the homogenous and uniform solubilization of the product and the production of a beverage with optimum appearance.

BRIEF DESCRIPTION OF THE DRAWINGS

Further characteristics and advantages of the present invention will become clearer from the following description, which is given by way of example and is not limiting, with reference to the attached schematic drawings, in which:

FIG. 4 is a section view of the collecting-piercing device of FIG. 3 with a cartridge inserted and perforated, during dispensing;

FIG. 5 is a section view of a further type of collecting-piercing device provided with a deformation control ring;

FIG. 6 is a view in plan of the collecting-piercing device of FIG. 5;

MODES FOR CARRYING OUT THE INVENTION

Figure 1:
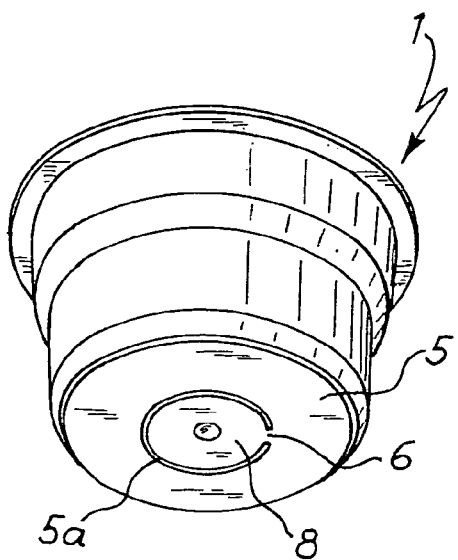
FIG. 1 is a perspective view of a cartridge which can be used on a dispensing group according to the present invention.
Figure 2:
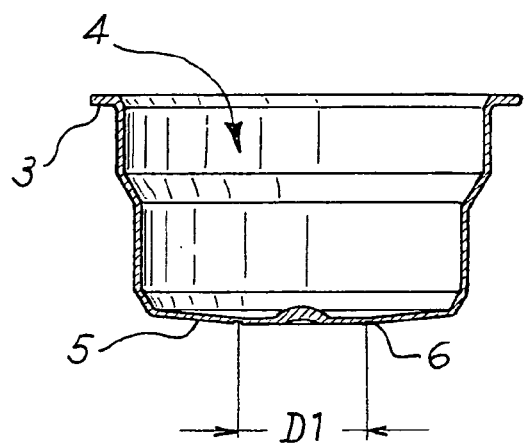
FIG. 2 is a section view of the cartridge of FIG. 1.
Figure 3:
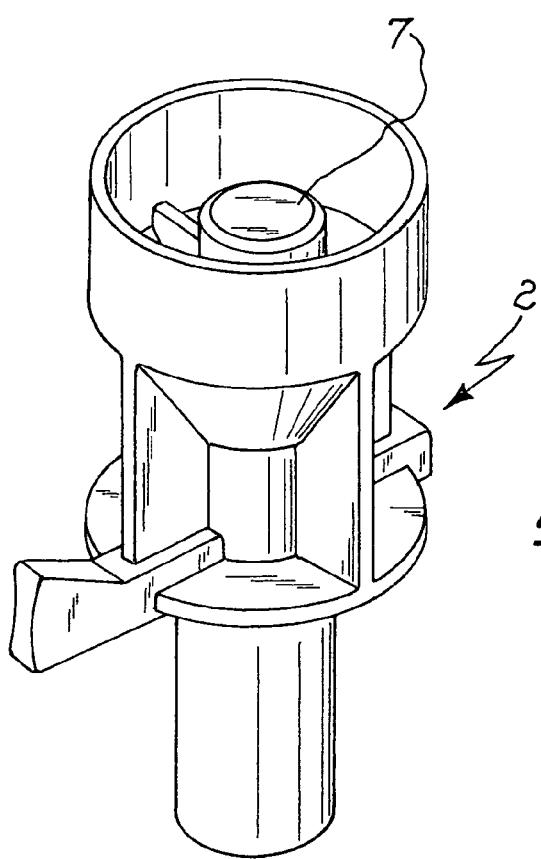
FIG. 3 is a perspective view of a collecting-piercing device.

With reference to FIGS. 1-3, the dispensing group according to the invention comprises a disposable cartridge 1 and collecting-piercing device 2. The cartridge 1 is equipped with an upper surface having an opening 4 encircled by a flange 3, and by a lower base wall 5 on which a breaking line 5a is obtained so that it defines an outlet opening for the solubilized product. The upper opening 4 is closed in a known way by a cover (not shown) provided with one or more inlet holes for the water of infusion, solubilization or dispersion-suspension. In a known way, the breaking line 5a consists of a linear curved portion of the base wall having reduced thickness and such that it can be easily broken by the piercing cylinder 7 of the collecting device 2; the line 5a is interrupted in correspondence to a portion 6 that constitutes a hinge for portion 8 of base wall (referred to as "cover") defined by the line 5a and preventing the separation of the same from the rest of base wall 5 after the cartridge has been engaged on the collecting-piercing device 2 (FIG. 4). In FIG. 4 a cartridge 1 is shown in dispensing position, i.e. in the position in which it has been engaged by cylinder 7, which has caused the opening of base wall 5 along the line 5a and the movement of base wall portion 8 towards the inside of the cartridge. The soluble product to be delivered is outlined and indicated by reference number 9.

According to the present invention the cartridge is made of a deformable material and the dimensions of the section of engagement with piercing cylinder 7 are equal to or greater than the dimensions of portion 8 of base wall 5 and are such that when the cartridge is inserted onto cylinder 7, during feeding of hot water under pressure, there is at least one port or space 10 between the base wall 5 and piercing member 7 to allow the exit of the solubilized product.

The port 10 is preferably provided in the shape of a circular crown (FIG. 7), i.e. a single port that extends substantially around the perimeter of the cylinder 7. However, other embodiments of the port are possible that allow for different shapes and/or the presence, during at least part of the beverage dispensing phase, of more ports between base wall 5 and cylinder 7. By using a line 5a of irregular shape it is possible to produce, for example, two or more ports.

In general, the maximum extent of the space between piercing member 7 and outlet profile, i.e. the maximum difference between the diameter D2 of the section of engagement of cylinder 7 and the diameter D1 of the outlet opening defined by the line 5a on base wall 5 of the cartridge is comprised in the range between 0.4 and 1.5 mm. In any case, the total area of port 10 during the dispensing is such as to produce the simultaneous dispensing of water and product for at least 75% of the water-dispensing time. This simultaneous dispensing can be checked visually by observing the colour of the liquid coming out from the cartridge outlet: if the liquid is little coloured or substantially uncoloured there is not simultaneous dispensing in the sense indicated above.

Therefore, an object of the invention is a soluble beverage dispensing group of the type indicated above, wherein the ratio between the area of piercing member 7 and the area defined by the breaking line 5a is comprised in the range between 1.0 and 1.284, preferably with the maximum extent of the space between the opening on the base wall and wall of piercing member 7 comprised in the range between 0.4 mm and 1.1 mm. By area of piercing member 7 is intended the area of the section of piercing member 7 taken at the height of base wall 5 of cartridge 1 when this is housed in the collecting device 2.

Figure 7:
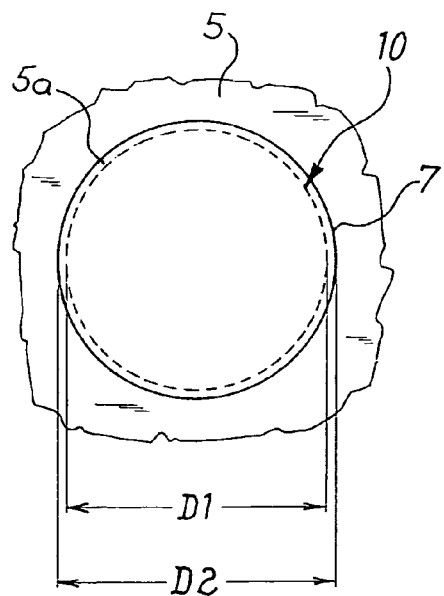
FIG. 7 is a schematic bottom view and in partial section of the piercing member and the cartridge base wall with outlet opening.
Figure 8:
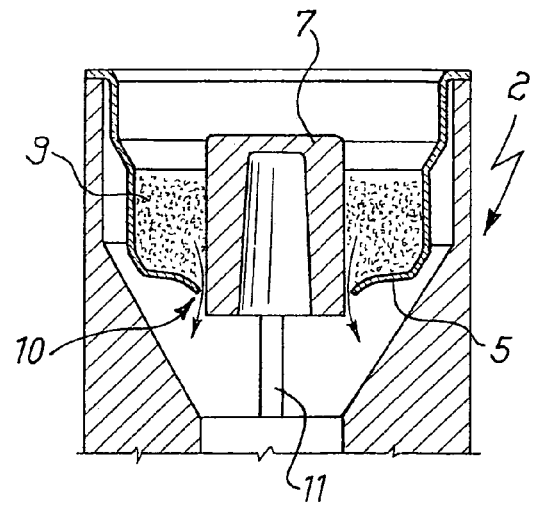
FIG. 8 is a magnified section view of the zone of engagement between piercing member and cartridge base wall during dispensing of the beverage.

In the following description, reference will be made to a preferred embodiment in which member 7 and line 5a are both circular (FIG. 7). In this embodiment, the port 10 i.e. the dispensing port formed during the dispensing of the beverage (FIG. 8) by deformation of the base wall of the cartridge along the line 5a, is theoretically substantially circular and crown-shaped in section and the ratio R between the diameter D2 of piercing member 7 and the diameter D1 of the outlet on base wall 5 of the cartridge is comprised in the range between 1.0 and 1.04, preferably between 1.0 and 1.02 and more preferably between 1.0 and 1.014.

As pointed out above, cartridge 1 is made of deformable material, generally produced from plastic material, for example: ethylene or propylene homo- or co-polymer suitable for use with foodstuffs. A preferred material has cristallinity higher than 70% and a percentage of amorphous polymer as to give visco-elastic deformation to the base wall of the cartridge during the feeding under pressure of hot water. The term "visco-elastic deformation" means that deformation of the material of the base wall, at least in an area around of the edge of the opening on base wall 5 along the line 5a, is reduced or quite eliminated either by the end of the dispensing or in one or more phases during the dispensing. In other words, during all the phase of dispensing of the beverage the material of the base wall, at least in said surround of the outlet opening, opposes the deformation caused by the water or other liquid being fed under pressure into the cartridge. In this way, the extent of the deformation and therefore of the dimensions of the delivery port 10 is controlled during the dispensing of the beverage. The material moulding techniques will be chosen so as to conserve as much as possible the percentage of amorphous polymer in the end product. Suitable materials are chosen from (co)polymers of ethylene and propylene, for example: (co)polymers of propylene comprising one or more alpha-olefins having 2-10 Carbon atoms, for example ethylene, 1-butene, 1-pentene, 4-methyl-1-pentene, 1-hexene, 1-octene; polypropylene formulations obtained by sequential polymerisation of propylene and its mixtures with ethylene and/or alpha-olefins. The (co)polymers generally have Melt Flow Index between 0.2 and 60 at 230° C./21.6 N.

In another embodiment of the invention the extent of the deformation is controlled by using mechanical means. For example: this happens when cartridges are used which undergo plastic deformation of the base wall following feeding under pressure of hot water. In this case the effect described above of opposition to the deformation by the material itself will not occur and "mechanical means" are used in order to limit the extent of the deformation of the base wall. FIGS. 5 and 6 show a preferred embodiment of such means, constituted by a ring 12 arranged concentrically with piercing cylinder 7 and spaced from it. Ring 12 is supported on three fins 11 and preferably has a surface portion 13 tilted towards cylinder 7, i.e. towards the inside of device 2, and towards the base wall. The inclination of the upper surface portion 13 is therefore comprised in the range between 0° and 45°, preferably between 15° and 38° and more preferably 30° to the horizontal. The said mechanical means can be present in addition to the use of cartridges with at least the base wall in elastically-deformable material.

Therefore, an object of the invention is a dispensing group of the type described above wherein there are present means of controlling the deformation of the base wall of the cartridge following the feeding of hot water. Such means are constituted either by a polymer material of construction of the cartridge that has substantially visco-elastic deformation and/or by mechanical means of support such as a base support ring or fins. In both cases, the extent of the deformation angle of the material around the edge 5a of the delivery opening of the product is maintained within the range between 1° and 45°, preferably between 15° and 38° and more preferably around 30° during the dispensing of the product solubilized in water.

Figure 9:
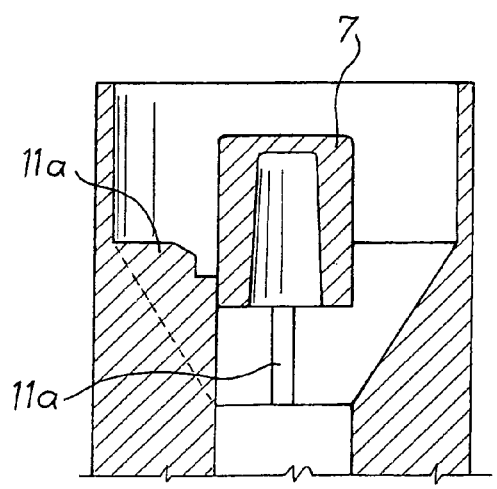
FIG. 9 is a section view of an embodiment of the collecting device.

As an alternative to ring 12, radial fins 11a can be used (FIG. 9) that extend to the height of surface 13 of ring 12 and that have a portion of their upper surface shaped in similar way to the slanted surface 13 of the ring and similarly distanced from member 7.

The invention will now be further described with reference to the following examples given purely by way of illustration.

EXAMPLE

Group 1. Ten (10) coffees were dispensed from a Tuttoespresso hot-beverage dispensing machine with a collecting device fitted with a piercing cylinder of diameter (D2) of 15.0 mm and diameter of the cartridge opening (D1) of 14.7 mm. The cartridge used is made of ethylene co-polymer with substantially visco-elastic deformation of the base wall.

Group 2. Another ten (10) coffees were dispensed with cartridge similar, but made of ethylene co-polymer with higher crystalline content and plastic deformation of the cartridge base wall. The collecting device presents a support ring inclined at 30 degrees to the inside and base of the said device.

Group 3. For comparison ten (10) coffees were dispensed under the same conditions and from the same machine using traditional cartridges and collecting device.

The assessment was carried out by measuring the volume (cc) of cream obtained. The results show an average of 16.8 cc of cream for each coffee dispensed in Group 1, an average of 9.6 cc of cream for the coffees dispensed in the Group 2 and an average of 6.8 cc of cream for each coffee dispensed in Group 3 (traditional).

The invention claimed is:

1. A dispensing group for the preparation of a beverage from a soluble product of the type comprising a disposable cartridge containing the soluble product, said cartridge comprising at least one outlet for the delivery of a beverage comprised of said soluble product and a fluid, wherein said at least one outlet opening is defined by at least one breaking line present on a wall of said cartridge, said group further comprising a collecting device having a seat suitable to receive said disposable cartridge and wherein said collecting device comprises at least one piercing element having a substantially cylindrical engagement portion to pierce said cartridge in correspondence to said breaking line and to fully enter the cartridge so that an exterior side surface of the cylindrical engagement portion fully engages said outlet opening completely prior to dispensing a beverage, the dispensing group further comprising a regulator arrangement for the delivery of said beverage, the regulator arrangement comprising at least one delivery port that is positioned during beverage dispensing between the piercing element and an edge of said outlet opening and extends substantially around the perimeter of the cylindrical engagement portion of said piercing element, wherein to obtain said at least one delivery port, the ratio R between the diameter D2 of the engagement portion of said piercing member and the diameter D1 of said outlet opening is 1≦R≦1.067.

2. A group according to claim 1, wherein the ratio R between the diameter D2 of the engagement portion of said piercing member and the diameter D1 of said outlet opening is 1≦R≦1.04.

3. A group according to claim 1, wherein the ratio R between the diameter D2 of the engagement portion of said piercing member and the diameter D1 of said outlet opening is 1≦R≦1.02.

4. A group according to claim 1, wherein the ratio R between the diameter D2 of the portion of said engagement piercing member and the diameter D1 of said outlet opening is 1≦R≦1.014.

5. A group according to claim 1, wherein said regulation arrangement comprises one or more stop elements for limiting deformation of a portion of the wall of said cartridge in proximity of said outlet opening.

6. A group according to claim 5, wherein said one or more stop elements comprise one or more fins which support said piercing member.

7. A group according to claim 5, wherein said one or more stop elements comprise at least one annular member having diameter greater than said outlet opening.

8. A group according to claim 7, wherein said annular member has a surface portion tilted towards the base wall of said cartridge.

9. A group according to claim 8, wherein said tilted surface portion has an inclination between 0° and 45° with respect to a horizontal plane supported on said annular member.

10. A group according to claim 8, wherein said tilted surface portion has an inclination between 15° and 35° with respect to a horizontal plane supported on said annular member.

11. A group according to claim 8, wherein said tilted surface portion has an inclination of 30° with respect to a horizontal plane supported on said annular member.

12. A group according to claim 1, wherein said regulation arrangement comprises a base wall of the cartridge including a visco-elastic plastic material.

13. A group according to claim 1, wherein the ratio R between the diameter D2 of the engagement portion of said piercing member and the diameter D1 of said outlet opening is $1 \leq R \leq 1.067$.

14. A group according to claim 1, wherein the at least one delivery port has a substantially annular shape during dispensing.

15. Disposable cartridge for the preparation of a beverage from a soluble product in a group for beverage preparation according to claim 1.

16. A method for the preparation of a beverage from a soluble product contained in a disposable cartridge, comprising lodging said cartridge in the seat of a collecting device having at least one piercing member in order to open an outlet opening from said cartridge, said opening being defined by at least one breaking line present on a wall of said cartridge and said wall being initially completely engaged by a substantially cylindrical engagement portion of said piercing member after said piercing member has fully entered the cartridge and formed said opening but before dispensing said beverage, with said substantially cylindrical engagement portion at least partially positioned within the cartridge, providing entry of a fluid into said cartridge through an entry port of the cartridge in order to obtain dispensing of a beverage comprising said soluble product and said fluid, providing regulation for dispensing said beverage by means of at least one delivery port extending around the perimeter of the cylindrical engagement portion of said piercing element and being disposed between the piercing member and an edge of said outlet opening during dispensing of said beverage, the ratio R between the diameter D2 of the engagement portion of said piercing member and the diameter D1 of said outlet opening being $1 \leq R \leq 1.067$.

17. A method according to claim 16, wherein the ratio R between the diameter D2 of the engagement portion of said piercing member and the diameter D1 of said outlet opening is $1 \leq R \leq 1.04$.

18. A method according to claim 16, wherein the ratio R between the diameter D2 of the engagement portion of said piercing member and the diameter D1 of said outlet opening is $1 \leq R \leq 1.02$.

19. A method according to claim 16, wherein the ratio R between the diameter D2 of the engagement portion of said piercing member and the diameter D1 of said outlet opening is $1 \leq R \leq 1.0 14$.

20. A method according to claim 16, wherein regulation of dispensing is carried out by means of one or more stop elements in order to limit deformation of a portion of wall of said cartridge in proximity of said outlet opening during said phase of beverage dispensing.

21. A method according to claim 20, wherein said one or more stop elements comprise one or more support fins of said piercing member.

22. A method according to claim 20, wherein said one or more stop elements comprise at least one annular member having diameter greater than said outlet opening.

23. A method according to claim 22, wherein said annular member has a surface portion tilted towards the base wall of said cartridge.

24. A method according to claim 23, wherein said tilted surface portion has an inclination between 0° and 45° with respect to a horizontal plane supported on said annular member.

25. A method according to claim 23, wherein said tilted surface portion has an inclination between 15° and 35° with respect to a horizontal plane supported on said annular member.

26. A method according to claim 23, wherein said tilted surface portion has an inclination of 30° with respect to a horizontal plane supported on said annular member.

27. A method according to claim 16, characterised by controlling deformation by using plastic material with visco-elastic deformation in at least part of the base wall of said cartridge.

28. A method according to claim 16, wherein the ratio R between the diameter D2 of the engagement portion of said piercing member and the diameter D1 of said outlet opening is $1 \leq R \leq 1.067$.

29. A method according to claim 16, wherein the at least one delivery port has a substantially annular shape during dispensing.

30. A disposable cartridge for the preparation of a beverage from a soluble product in a group for beverage preparation according to the method of claim 16.

31. A method for the preparation of a beverage from a soluble product contained in a disposable cartridge, comprising:

lodging said cartridge in the seat of a collecting device having at least one piercing member in order to form an outlet opening from said cartridge, said opening being defined by at least one breaking line present on a wall of said cartridge and said wall being initially completely engaged by a substantially cylindrical engagement portion of said piercing member after said piercing member has entered the cartridge and formed said opening, but before dispensing of said beverage;

with said cylindrical engagement portion being at least partly positioned within the cartridge, providing entry of a hot fluid under pressure into said cartridge through an entry port of the cartridge thereby deforming the outlet opening and creating at least one delivery port in order to dispense a beverage comprising said soluble product and said fluid, said at least one delivery port extending substantially around the perimeter of the cylindrical engagement portion of said piercing element and being disposed between the piercing member and an edge of said outlet opening during dispensing of said beverage, the ratio R between the diameter D2 of the cylindrical engagement portion of said piercing member and the diameter D1 of said outlet opening being $1 \leq R \leq 1.067$, and regulating deformation of the at least one delivery port during dispensing of said beverage.

32. A method according to claim 31, wherein the regulating includes forming the wall of the cartridge from a visco-elastic material designed to oppose deformation induced by introduction of hot fluid under pressure into the cartridge.

33. A method according to claim 32, wherein the regulating further comprises providing a structure to oppose said induced deformation.

34. A method according to claim 31, wherein said wall of said cartridge surrounding the breaking line comprises a plasticly deformable material.

35. A method according to claim 31, wherein said wall of said cartridge surrounding said breaking line comprises a visco-elastic material.

36. A method according to claim 31, wherein the at least one delivery port has a substantially annular shape.

37. A method of preparing a beverage from a soluble product contained in a disposable cartridge, the method comprising:

providing the cartridge with a bottom wall having a breaking line that defines an outlet opening;

piercing the bottom wall with a piercing member having a diameter equal to or greater than a diameter of the outlet opening such that at least a portion of the piercing member remains inside the cartridge with an edge of the outlet opening engaging an exterior side surface of the piercing member prior to carrying out a dispensing operation;

introducing hot fluid under pressure into the cartridge, with said portion positioned within and inside the cartridge, to deform and expand the outlet opening to allow dispensing of the soluble product when combined with said pressurized hot fluid; and regulating deformation and/or expansion of the outlet opening during said dispensing operation so that said solubilized product is throttled when passing through the expanded outlet opening to generate an enduring layer of small-bubble cream.

38. A method according to claim 37, wherein said bottom wall of said cartridge surrounding the breaking line comprises a plasticly deformable material.

39. A method according to claim 37, wherein said bottom wall of said cartridge surrounding said breaking line comprises a visco-elastic material.

40. A method according to claim 37, wherein the outlet has a substantially annular shape during said dispensing operation.

* * * * *